United States Patent
Pitts et al.

[11] 3,733,424
[45] May 15, 1973

[54] ELECTRONIC STRAIN-LEVEL COUNTER

[75] Inventors: Felix L. Pitts, Newport News; John L. Spencer, Hampton, both of Va.

[73] Assignee: The United States of America as represented by the Administrator of the National Aeronautcs and Space Administration, Washington, D.C.

[22] Filed: July 8, 1971

[21] Appl. No.: 160,859

[52] U.S. Cl..............73/88.5 R, 73/67.3, 73/91, 235/92 MT
[51] Int. Cl...............................G01b 7/16
[58] Field of Search............73/67.3, 88.5 R, 73/91; 235/92 MT, 151.3

[56] References Cited

UNITED STATES PATENTS

| | | |
|---|---|---|
| 2,774,535 | 12/1956 | Anderson..................73/88.5 R X |
| 3,517,550 | 6/1970 | Leventhal..................73/88.5 R |
| 3,628,377 | 12/1971 | Weiss..........................73/91 |
| 3,643,513 | 2/1972 | Weaver........................73/517 R |
| 3,193,762 | 7/1965 | Wu.............................73/88.5 R X |
| 3,441,718 | 4/1969 | Hatherell et al..............73/91 X |

FOREIGN PATENTS OR APPLICATIONS 680,311 10/1952 Great Britain................73/88.5 R Primary Examiner—Charles A. Ruehl
Attorney—Howard J. Osborn et al.

[57] ABSTRACT

An electronic strain level counter for obtaining structural strain data on in-flight aircraft. The device counts the number of times the strain at a point on a structural member of the aircraft exceeds each of several preset levels. A dead band is provided at each level to prohibit the counting of small strain variations around a given preset level.

2 Claims, 3 Drawing Figures

ELECTRONIC STRAIN-LEVEL COUNTER

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The invention relates generally to strain measurements and more specifically concerns a device for counting the number of times that the strain in a structural member exceeds each of several preselected levels.

Structural fatigue assessment of in-service aircraft is based primarily on visual and x-ray inspection procedures. An electronic device which counts the number of times the strain at a point in a structural member exceeds each of several preset levels is needed to augment these established procedures. The complexity of the structural-fatigue assessment of aircraft does not allow structural-lifetime prediction to be based entirely on data generated by strain-level counters. However, use of the strain counters in a fleet of aircraft can yield a statistical-data body on the number and severity of the in-service structural strains. Based on this information, a graduated scale of aircraft-use severity can be generated and used to aid in scheduling inspection and maintenance. In addition, correlation of the data with observed fatigue failures might aid in general fatigue assessment of aircraft of the same type.

In the past, devices such as extensiometers and mechanical scratch gages have been used to accomplish the strain level counter function. The disadvantage of the extensiometer approach is that a long gage length is required to obtain high sensitivity. The primary disadvantage of the mechanical scratch gage is that the data output is an analog scratch waveform on a small metallic disk which results in difficult data reduction.

It is therefore the primary object of this invention to provide a simple, accurate and reliable electronic device which counts the number of times the strain at a point in a structural member exceeds each of several preselected levels. Another object of the invention is to provide an adjustable dead band around each of the preselected levels to prohibit the counting of small strain variations due to flexural oscillations around the preselected levels.

SUMMARY OF THE INVENTION

The strain level counter that constitutes this invention counts the number of times the strain at a point in a structural member exceeds each of several preset levels. By using hysteresis, a dead band is provided at each level so that after the strain exceeds a given level and a count is registered, the strain must decrease below the dead band and then increase again before another count is registered. The adjustable dead band prohibits the counting of small strain variations due to flexural oscillations around a given level.

In the present invention, each of several separate counters counts the number of times the strain exceeds a different preselected level. The system uses a metallic resistance strain gage as the sensor, micro-electronic and discrete solid state circuits for signal processing, and electromechanical counters for data storage. The bridge output is a low-level differential analog voltage proportional to the applied strain. This low-level signal is amplified and used as an input to several level detectors with hysteresis. As the input to each level detector increases through a preset upper threshold voltage, the state of the output changes from high to low. The state of the output cannot change again until the input decreases below a preset lower threshold voltage. When the input increases through the upper threshold voltage, a pulse is generated to drive an electromechanical counter.

In order to circumvent the drift problems of d.c. coupled amplifiers, a.c. bridge excitation obtained from an astable multivibrator is employed. The output from the bridge is a pulse train with an amplitude proportional to the strain input. This signal is amplified by an a.c. coupled amplifier. The output of the amplifier is coupled to the level detectors, which are enabled during each data pulse by a signal from a strobe-pulse generator. The astable multivibrator also provides the input to the strobe-pulse generator. When the amplitude of the data pulse exceeds a preset level, a signal generated by the level detector causes a count to be registered in an electromechanical counter.

DETAILED DESCRIPTION OF THE INVENTION

Figure 1:
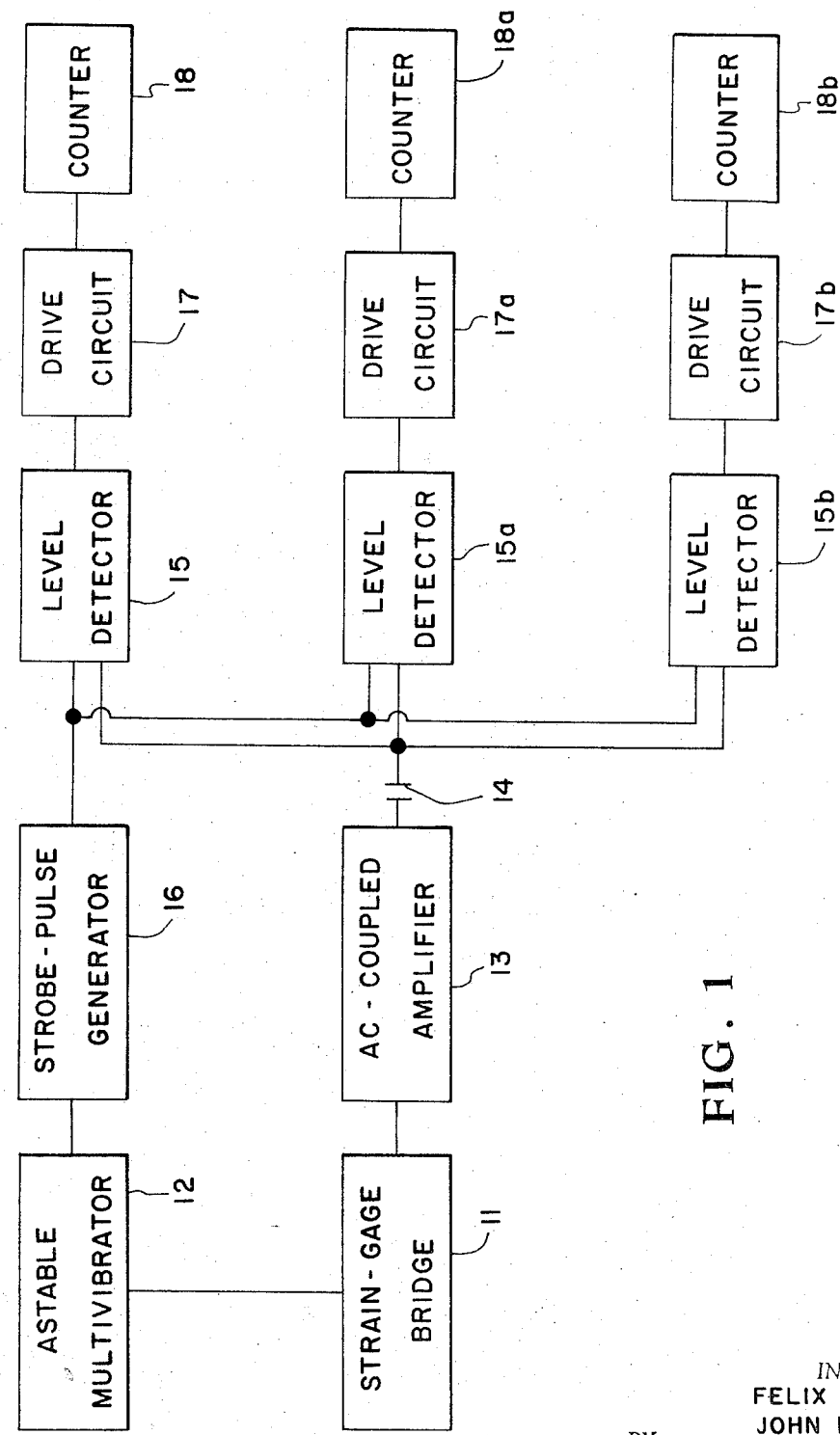
FIG. 1 is a block diagram of an embodiment of the invention.

Turning now to the embodiment of the invention selected for illustration in the drawings, the number 11 designates a strain gage bridge which is attached to the structural member whose strain is to be measured. Strain gage bridge 11 is of the well known resistance type strain gage which produces an output signal whose amplitude is proportional to the strain. Strain gage bridge 11 is excited by an astable multivibrator 12 with a frequency of approximately 90 hertz and a pulse duration of approximately 0.5 millisecond. The pulse duration of the multivibrator is long enough to allow all system transients to decay before the level detectors are enabled. Hence, the output of strain gage bridge 11 is a series of pulses whose amplitudes are proportional to the strain. If there is no strain on the bridge 11, the bridge is balanced and hence there is no output. If a strain is applied to the bridge 11, then the bridge becomes unbalanced and a series of pulses are produced at the output whose amplitudes are proportional to the strain being applied to the bridge. The output of bridge 11 is amplified by an a.c. coupled amplifier 13 which is an operational amplifier with a closed loop gain that is determined by the feedback resistor and the output impedance of the bridge. The output of amplifier 13 is capacitively coupled through a capacitor 14 to level detectors 15, 15a, and 15b so that d.c. drift does not affect the system performance so long as it is not severe enough to cause saturation. Only three level detectors are shown in FIG. 1; however, as many of these level detectors as desired can be used. In addition to exciting bridge 11, astable multivibrator 12 is also applied to a strobe pulse generator 16. Strobe pulse generator 16 is a one-shot multivibrator that is triggered on by the astable multivibrator 12 at the beginning of an excitation pulse and switches off to enable the level detectors 15, 15a and 15b. Each of the level detectors has an adjustable d.c. reference source which is adjusted to a different preselected level. This level is compared with the output from amplifier 13 and when the output of the amplifier becomes greater the corresponding drive circuit 17, 17a or 17b produces a pulse which is counted by the corresponding counter 18, 18a or 18b. Drive circuit 17, 17a and 17b are one-shot multivibrators which produce a voltage pulse or 20 millisecond duration to drive the electromechanical counters 18, 18a and 18b. Each time the strain on the strain gage bridge 11 exceeds the value set into one of the level detectors the corresponding counter registers a count. In order to keep the level detectors from causing its corresponding counter to register a count for small changes around the preset level of the level detector, each of the level detectors is provided with hysteresis which will be described in detail in FIG. 2.

Figure 2:
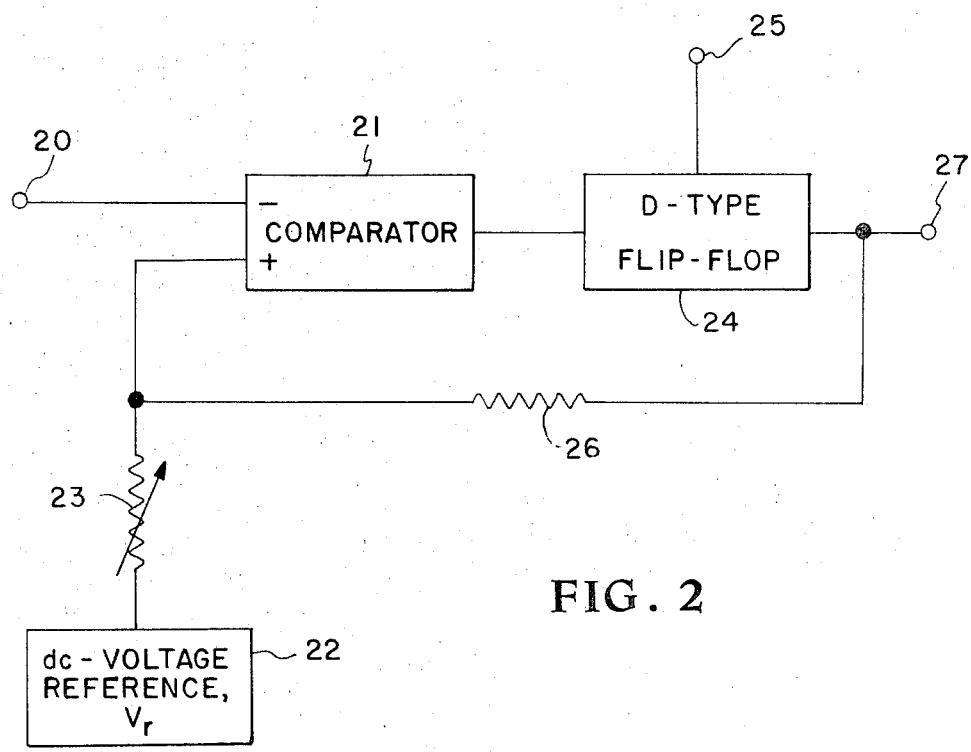
FIG. 2 is a schematic drawing of the level detectors shown in FIG. 1.

Referring now to FIG. 2, there is shown a schematic drawing of one of the level detectors in FIG. 1. The pulses from amplifier 13 in FIG. 1 are applied through the capacitor 14 to terminal 20 which is connected to the inverting input (−) of a comparator 21. The amplitudes of these pulses are compared with a d.c. voltage reference ($V_r$) 22 which is applied through a variable resistor 23 to the comparator 21. A different $V_r$ is used in each level detector and variable resistor 23 is used to set the hysteresis in each level detector. The output of comparator 21 is applied to a D-type flip-flop 24 which also has the pulses from stroke pulses generator 16 applied to it through a terminal 25. When a strobe input on terminal 25 changes from a low binary state to a high binary state the output of flip-flop 24 assumes the same binary state as the comparator output. The output flip-flop 24 is applied through a resistor 26 to the comparator 21. The output of flip-flop 24 is also applied through a terminal 27 to one of the drive circuits.

The function of the level detector circuitry is to compare the amplitude of the pulse from the amplifier with a preset d.c. voltage level at each positive transition of the strobe input. Positive feedback from the output of the flip-flop to the noninverting input (+) of the comparator through resistor 26 enables the circuitry to have hysteresis. The voltage on the noninverting input of the comparator is denoted by $V_t$ and is described by $$V_t = V_r + [R_{23} (V_o - V_r)]/(R_{23} + R_{26})$$

where $V_r$ is the voltage of the d.c. voltage reference 22, $V_o$ is the output voltage of the flip-flop 24, $R_{23}$ is the resistance in ohms of resistor 23 and $R_{26}$ is the resistance in ohms of resistor 26. The comparator 21 output is connected to flip-flop 24 so that when the strobe input changes from a low binary state to a high binary state the output of the flip-flop assumes the same binary state as the comparator output. The flip-flop is enabled after all transients of the signal pulse have decayed.

Figure 3:
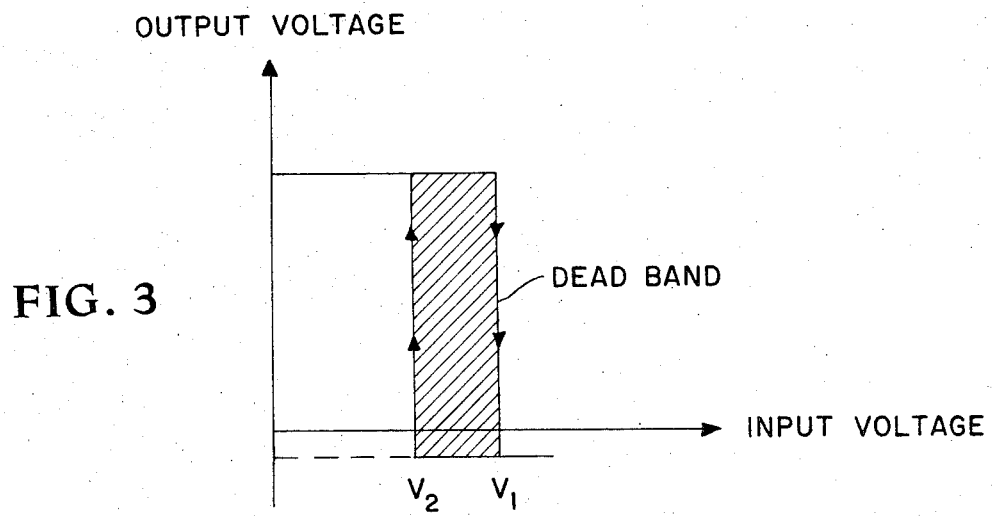
FIG. 3 is a graph for the purpose of describing the transfer function of the level detectors.

With zero strain on the resistive strain gage 11, the amplifier 13 output signal level during enabling is zero and the outputs of both the comparator 21 and the flip-flop 24 are high. When the output of the flip-flop is high, the voltage of noninverting input $V_t$ of the comparator is defined to be the upper threshold voltage $V_1$ (see FIG. 3) and is described by $$V_1 = V_r + [R_{23} (V_o\mathrm{max} - V_r)]/(R_{23} + R_{26})$$

where $V_o\mathrm{max}$ is the high voltage output of the flip-flop. Once the input signal exceeds $V_1$, the output of the comparator becomes low during the signal pulse and the output of the flip-flop changes from a high to a low state at the positive transition of the strobe input. This negative transition of the flip-flop activates the drive circuit and counter so that the exceedance of the preset level of strain is counted. When the output of the flip-flop changes from a high $V_o\mathrm{max}$ to a low state $V_o\mathrm{min}$, the voltage at the comparator noninverting terminal decreases because of the positive feedback through resistor 26. This lower $V_t$ is defined to be the lower threshold $V_2$ and is described by $$V_2 = V_r + [R_{23} (V_o\mathrm{min} - V_r)]/(R_{23} + R_{26})$$

The output of the flip-flop becomes high again only when the signal pulse amplitude decreases to a value below $V_2$ and a positive transition of the strobe pulse occurs. The hysteresis voltage $V_1 - V_2$ is given by $$V_1 - V_2 = [R_{23} (V_o\mathrm{max} - V_o\mathrm{min})]/(R_{23} + R_{26})$$

Calibration of the system is accomplished by use of a shunt resistance across one leg of the bridge to simulate a desired strain level. The upper threshold for each channel of the level detector is set by adjusting $V_r$ and the hysteresis is set by adjusting resistor 23.

The advantages of the electronic strain level counter that constitutes this invention is the small gage length of the metallic strain gage sensors; in addition, the data reduction is mechanized within the electronic strain level counter and the data output is stored in easy-to-read electromechanical counters.

It is to be understood that the form of the invention herewith shown and described is to be taken as a preferred embodiment Various changes may be made in the shape, size and arrangement of parts. For example, equivalent elements may be substituted for strain gage bridge 11, astable multivibrator 12, strobe-pulse generator 16, amplifier 13, drive circuits 17 and counters 18 without departing from the spirit or scope of the invention as defined in the following claims.

What is claimed is:

1. An electronic strain level counter for obtaining strain data on a structural member comprising:
    means including a source of constant amplitude electrical pulses for producing electrical pulses having amplitudes indicative of the strain on said structural member;
    a generator means receiving said constant amplitude electrical pulses for generating strobe pulses;
    a plurality of level detector means with said strobe pulses and said electrical pulses having amplitudes indicative of strain applied to each level detector means;
    each of said level detector means having a different amplitude preset into it and including a comparator for comparing said electrical pulses having amplitudes indicative of strain with said preset amplitude and means connected to the output of said comparator and enabled by said strobe pulses for producing an electrical signal each time the amplitude of one of said electrical pulses indicative of strain exceeds said preset amplitude and for providing a dead band so that after the strain exceeds the preset amplitude and an electrical signal is produced the strain must decrease below the dead band and then increase again before another electrical signal is produced; and means associated with each of said level detector means for counting said electrical signals whereby the count on each of said counting means is the number of times the strain exceeds the preset amplitude in the corresponding level detector means.

2. An electronic strain level counter according to claim 1 wherein said means for producing an electrical signal each time the amplitudes of one of the electrical pulses indicative of strain exceeds said preset amplitude and for providing a dead band is a D-type flip-flop with means for adding the output of the flip-flop to said preset amplitude.

* * * * *